A. SALOF.
ANIMAL TRAP.
APPLICATION FILED MAY 20, 1914.
1,165,289.
Patented Dec. 21, 1915.
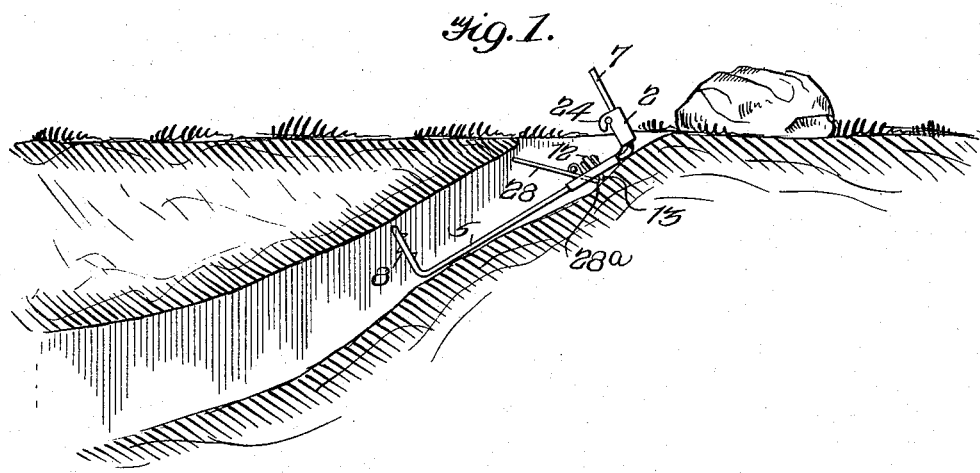
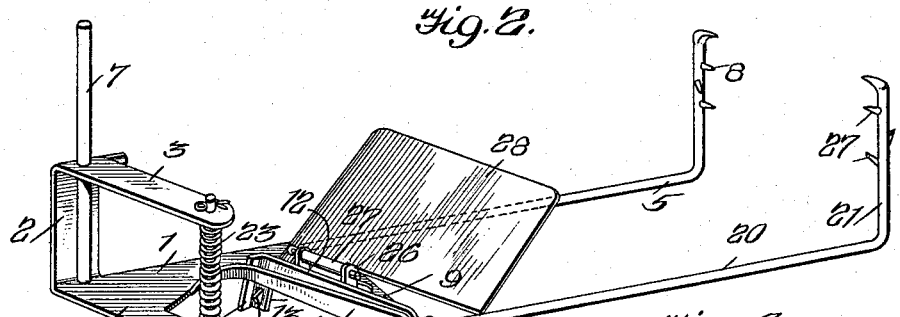
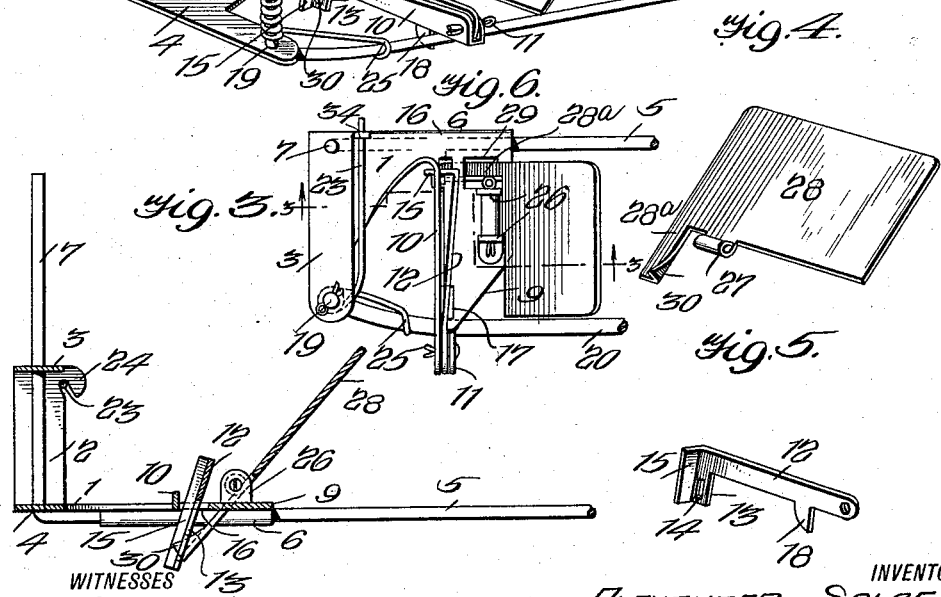
WITNESSES
INVENTOR
ALEXANDER SALOF,
BY Munn&Co
ATTORNEYS

UNITED STATES PATENT OFFICE.

ALEXANDER SALOF, OF OAKLAND, CALIFORNIA.

ANIMAL-TRAP.

1,165,289.

Specification of Letters Patent. Patented Dec. 21, 1915.

Application filed May 20, 1914. Serial No. 839,796.

*To all whom it may concern:*

Be it known that I, ALEXANDER SALOF, a citizen of the United States, and a resident of Oakland, in the county of Alameda and State of California, have made a new and useful Improvement in Animal-Traps, of which the following is a specification.

This invention relates to animal traps, and more particularly to a trap for catching gophers and ground squirrels.

One of the principal objects of the invention is to provide a trap having a pair of jaws carrying barbs movable one toward the other by spring action, the means for setting one of the jaws against the tension of the spring adapted to be tripped by contact of the rodent with the setting means, or by contact of earth thrown by the rodent on the setting means, whereby to trip the same and allow impalement of the animal upon closure of the jaws.

A further object of the invention is to provide a trap of the class described which will be extremely simple in construction, durable, efficient in operation and inexpensive to manufacture.

With these and other objects in view which will become apparent as the description proceeds, the invention resides in the construction, combination and arrangement of parts hereinafter more fully described and claimed and illustrated in the accompanying drawing, in which like characters of reference indicate like parts throughout the several figures, of which—

Figure 1 represents an elevational view of the trap, showing the same as placed in position ready for operation. Fig. 2 represents a perspective view of the trap. Fig. 3 represents a longitudinal sectional view on the line 3—3 of Fig. 6. Fig. 4 represents a perspective view of the trigger. Fig. 5 represents a perspective view of the latch. Fig. 6 represents a fragmentary top plan view of the trap.

Referring more particularly to the drawing, the trap comprises a metallic plate 1, having at one end an upwardly extending portion 2 provided with an arm 3, overhanging the base plate and an arm 4, formed on the base plate and shaped similarly to arm 3. A stationary jaw is secured to plate 1 and comprises a straight wire 5 around which the outer edge of the plate is turned as at 6, to secure the wire, said wire at its inner end extending through an opening in the plate at the inner end of arm 4 and through a registering opening in the inner end of arm 3 and extending upwardly for a distance as at 7 to prevent the trap from being pulled into a burrow by an animal, as will hereinafter appear. The outer end of wire 5 is bent upwardly and provided with an inwardly projecting prong 8.

The base plate 1 is formed in spaced relation with the arm 4 with a bridge 9 extending parallel with said arm and having a rear upstanding flange 10 coacting with an ear 11 formed in the outer end of the bridge to form a guide and journal for latch 12, pivoted at its outer end between ear 11 and flange 10, said latch provided at its inner end with a depending finger 13 having an opening 14 in the lower end thereof, said finger provided with a rearwardly extending flange 15, and the finger is adapted to extend, when the trap is set, through an opening 16 cut in bridge 9 near the wire 5. A second opening 17 is provided in spaced relation to opening 16 and at the opposite end of the bridge therefrom and through said opening 17 projects a lug 18 depending from the latch.

The outer ends of arms 3 and 4 are provided with openings through which rotatably extends the inner upwardly bent portion 19 of the movable jaw 20, said jaw also being formed of a piece of wire extending, when the trap is set, in slightly diverging relation with wire 5 and being bent upwardly at its outer end as at 21 and provided with a plurality of prongs 22 for impaling an animal against the opposite jaw when the trap is sprung.

A strong spring 23 is coiled about the upright portion 19 of the movable jaw between arms 3 and 4 and at one end is anchored in a keeper or lug 24 projecting outwardly from the vertical portion 2 of the base plate, the opposite end of the spring being anchored over the movable jaw as at 25, at a point between arm 4 and bridge 9, said spring tending to hold said jaws in closed relation relatively to each other.

Extending upwardly from bridge 9 in advance of latch 12 are a pair of spaced ears 26 between which an eye 27 formed on the rear edge of a substantially rectangular trigger 28 is journaled, said trigger provided at one side with an extending trip arm 28ᵃ projecting through an opening 29 in advance of opening 16, said trip arm provided with an upwardly extending triangular shaped flange 30 which, when the trap is set, is adapted to engage latch 12 in the opening 14 provided in the lower end of finger 13 for maintaining said latch in lowered position against the tension exerted thereon by reason of the movable jaw 20 pressing against the lug 18.

It will be noted that the opening 29 through which trap arm 28ª extends is large enough to allow oscillatory motion of said arm, and it will be further noted that the trigger 28 is normally at an inclined position whereby to maintain the trip arm in engagement with the latch by reason of the weight of the trigger, which is just great enough to overcome the tension exerted upon the latch by the movable jaw. The trigger is of a width to substantially span the distance between the trap jaws when the trap is set.

The operation of the device may be briefly described as follows: The trap may be set in a gopher or ground squirrel burrow at the entrance thereof, substantially in the position shown in Fig. 1, with the jaws extending into the opening and the trigger acting as a substantial closure for the opening, and upon the attempt of an animal to emerge from its burrow, the trigger will be struck, lifting it to shift the trip arm from the latch thus allowing the tension of the movable jaw to throw the latch 12 upwardly until the lug 18 is past the path of movement of the jaw, whereupon said jaw, by action of the spring, will be forced toward the stationary jaw, thus impaling the animal upon the prongs 8 and 22.

A peculiar habit of gophers is to block up the entrance to their burrows with earth, when the burrow has been enlarged sufficiently, or when a disturbance of any kind occurs near the entrance, such a disturbance for instance as will necessarily result in the placing of the trap in the burrow. It will follow that upon movement of the earth by the gopher against the trigger, the latter will be tripped and the gopher impaled in the manner previously described.

The portion 7 of the wire forming the stationary jaw extending above the arm 3, is adapted to prevent the animal upon being trapped, from drawing the trap within the burrow.

Although I have described the preferred embodiment of my invention I may desire to make such changes in the construction, combination and arrangement of parts thereof as do not depart from the spirit of the invention and the scope of the appended claims.

I claim:—

1. An animal trap comprising a base plate having an upright portion, a lower arm provided on the plate, an upper arm extending from said upright portion and overhanging the lower arm, a stationary jaw including a length of stout wire, said wire at one end extending upwardly through said arms and projecting above the upper arm, said plate at one edge being turned upon said wire for securing the same in place, a movable jaw including a second length of wire having an upwardly extending portion at its inner end journaled in the arms, and means for controlling the operation of the movable jaw.

2. A trip comprising a body portion, a stationary jaw fixed in relation thereto, a movable jaw journaled in the body portion and movable toward said stationary jaw, a spring for normally tending to move last said jaw toward the stationary jaw, a latch extending transversely of the jaws, and pivoted to said body portion, said latch provided with a depending lug adapted to maintain the movable jaw in spaced relation with the stationary jaw, said latch provided with a depending finger, a trigger pivoted to the body portion, said trigger substantially spanning the space between said jaws, said trigger provided with a depending trip arm, said trip arm engaging an opening provided in the latch finger, substantially as described.

3. A trap including a base plate, a movable and a stationary jaw secured thereto, a spring for actuating said jaws, a bridge provided on the plate and extending between the jaws, a latch pivotally connected to the bridge opposite the stationary jaw, a lug carried by the latch and adapted to maintain the movable jaw in set position, a finger carried by the latch, a trigger pivotally connected to the bridge, and a trip arm carried by the trigger and adapted to engage said finger.

4. A trap including a base plate having an upper and a lower arm, an upright portion on the plate and connecting the arms at one end thereof, a keeper provided on said upright portion, a pair of jaws having upwardly extending portions projecting through said arms, one of said jaws being movable, and a spring coiled upon one of the upwardly extending jaw portions between the arms and engaging at one end upon the movable jaw, the opposite end of said spring engaging said keeper.

ALEXANDER SALOF.

Witnesses:
M. HENAS,
FRANK M. BIRD.

Copies of this patent may be obtained for five cents each, by addressing the "Commissioner of Patents, Washington, D. C."